UNITED STATES PATENT OFFICE.

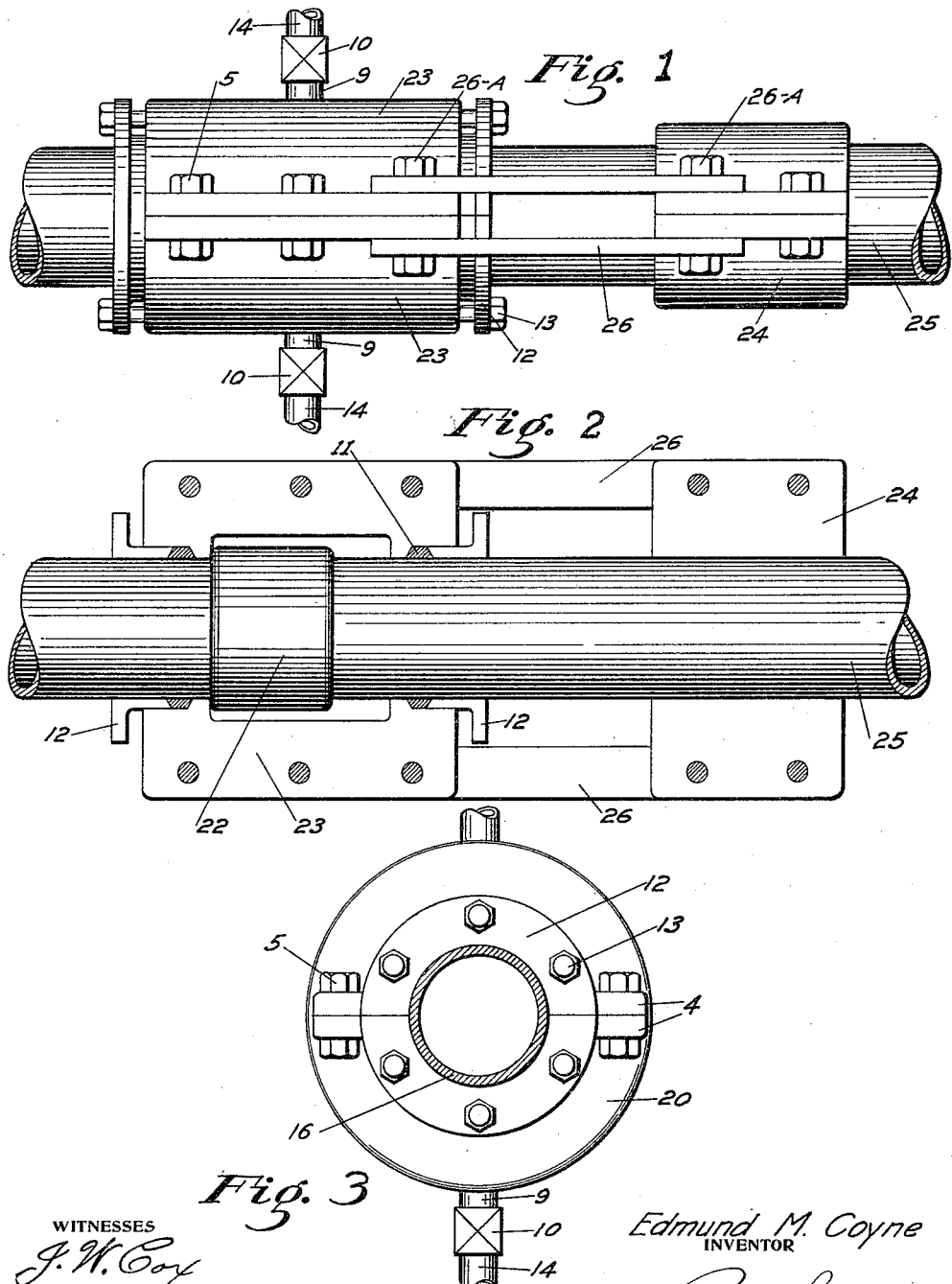

EDMUND M. COYNE, OF BIRMINGHAM, ALABAMA, ASSIGNOR OF ONE-HALF TO WILLIAM V. MENTZELL.

PIPE-REPAIR SLEEVE.

1,140,501.    Specification of Letters Patent.    Patented May 25, 1915.

Application filed January 2, 1914. Serial No. 810,001.

*To all whom it may concern:*

Be it known that I, EDMUND M. COYNE, a citizen of the United States of America, residing at Birmingham, in the county of Jefferson and State of Alabama, have invented certain new and useful Improvements in Pipe-Repair Sleeves, of which the following is a specification.

My invention relates to improvements in repair sleeves for pipes which are so designed and equipped as to adapt them to quickly and effectively stop leaks at any point in the pipe or in joints thereof and which further provides a simple and economical means for tapping a branch pipe onto the main pipe at any point and without shutting off the steam or liquid pressure in the main pipe to make such branch connection.

A further object of my invention is to provide a clamp connection for the repair sleeve which is essentially designed for use in cases where the leakage at the end of a sleeve joint would have a tendency to blow the repair sleeve endwise and strip the sleeve coupling from the pipe.

My invention further comprises the novel details of construction and arrangement of parts which in their preferred embodiment are illustrated in the accompanying drawings, in which:—

Figure 1 is a top plan view showing my improved sleeve and clamp connected in position on a pipe. Fig. 2 shows in plan view a half section of the pipe and clamp. Fig. 3 is an end elevation of Fig. 1.

Similar reference numerals refer to similar parts throughout the drawings.

In the drawings I show the repair sleeve designed for repairing leaks in pipe joints. Here it is frequently the case that the leaks occur at one or the other end of the sleeve and if the leak, after the repair sleeve has been applied, should open up suddenly it would have a tendency to blow the repair sleeve lengthwise of the pipe and with the result that it might strip the sleeve connection, such as 22, from the pipe line and a serious accident might result. To meet these conditions I provide a repair sleeve formed of half sections 23 which are recessed to receive in them the sleeve 22 and at each end of the recess the sections fit snugly about the pipe. The end joints are packed by a packing 11 and sectional glands 12 which are attached to the ends of the casing sections by bolts 13. The casing sections are provided with side flanges 4 which are bolted together by bolts 5. In addition I provide a clamp comprising half sections 24 which are flanged and bolted tightly about one section 25 of the pipe, the clamp being affixed on the opposite end of the sleeve joint 22 from that at which the leak has occurred. After the repair sleeve has been applied to the pipe in the manner described, I provide one or more bars or connecting rods 26 which, for convenience, connect the clamp 24 to the repair sleeve 23 by being bolted to the flanges of the latter by the elongated end bolts 26$^a$ at adjacent ends of the repair sleeve and clamp. Preferably such connecting rods are applied on each side of the sleeve and clamp, as shown in Fig. 2. By means of the clamp I can secure a strong and rigid connection to the pipe and by means of the connecting bars 26 I am enabled to hold the repair sleeve against any tendency to be blown lengthwise of the piping so that its end near the clamp sleeve would not strike and strip the sleeve connection 23 from the pipe.

I provide a plurality of lateral ports which are tapped through the side walls of the casing 23 into the chamber that receives sleeve 22, these ports being threaded and adapted to receive a nipple 9 to which a suitable valve casing 10 is connected. I preferably provide at least one of these nipples 9 in each section of the sleeve. In order to permit the glands to be inserted while the steam or liquid pressure is still on and therefore flowing in substantial volume through the leaking sleeve or joint, the valves 10 are opened and pipes or hose 14 are connected to the valve casings and lead to a suitable point of discharge sufficiently remote to prevent any interference with the work of applying the glands. As soon as the repair sleeve has been well packed the valves 10 are closed, the hose 14 are removed, and the repairing is complete.

I utilize any suitable packing strip for packing the joint between the meeting edges of the sleeve sections, any kind of packing strip being effective when laid lengthwise between the flat machined side edges of the sleeve and the edges drawn together by the bolts 5 to compress the packing and effectively seal the side joints of the sleeve. The glands described take care of the end packing of the sleeve.

Having thus described my invention, what I claim as new and desire to secure by Letters Patent, is:—

A repair equipment for pipes comprising in combination a repair sleeve formed of longitudinal half sections, each half section having side flanges adapted to abut, means to bolt the flanges together to fasten the sleeve about the pipe to be repaired, a sectional pipe clamp formed of half sections having flanged meeting edges, means to bolt said flanges together to attach said clamp to the pipe, and connecting bars having their ends bolted to the flanges of the sleeve and clamp, substantially as and for the purposes described.

In testimony whereof I affix my signature in presence of two witnesses.

EDMUND M. COYNE.

Witnesses:
WILLIAM V. MENTZELL,
NORME WELSH.

Copies of this patent may be obtained for five cents each, by addressing the "Commissioner of Patents, Washington, D. C."